(12) United States Patent
Hattori et al.

(10) Patent No.: US 7,638,909 B2
(45) Date of Patent: Dec. 29, 2009

(54) ROTOR OF ROTARY-ELECTRIC MACHINE

(75) Inventors: Kenichi Hattori, Hitachiota (JP);
Mitsuru Saeki, Hitachi (JP); Akitomi Semba, Hitachi (JP); Tadaaki Kakimoto, Hitachi (JP); Takashi Watanabe, Hitachi (JP); Manabu Suzuki, Hitachi (JP); Takashi Shibata, Hitachi (JP); Seijiro Muramatsu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 11/581,437

(22) Filed: Oct. 17, 2006

(65) Prior Publication Data

US 2007/0085428 A1    Apr. 19, 2007

(30) Foreign Application Priority Data

Oct. 18, 2005    (JP)    ............................. 2005-302428

(51) Int. Cl.
*H02K 3/04* (2006.01)
*H02K 3/24* (2006.01)
*H02K 9/00* (2006.01)

(52) U.S. Cl. ............................. 310/58; 310/61; 310/201

(58) Field of Classification Search .................... 310/52, 310/58–61, 60 A, 260, 270
See application file for complete search history.

(56) References Cited

U.S. PATENT DOCUMENTS 4,709,177 A * 11/1987 Kaminski .................... 310/59
6,087,745 A * 7/2000 Dreher ......................... 310/58
6,252,318 B1 * 6/2001 Kazmierczak ............... 310/61

FOREIGN PATENT DOCUMENTS

| DE | 3700508 A1 | * | 7/1988 |
| JP | 63-15644 | | 1/1988 |
| JP | 2003-088022 | | 3/2003 |
| JP | 2003088022 A | * | 3/2003 |

* cited by examiner

*Primary Examiner*—Tran N Nguyen
(74) *Attorney, Agent, or Firm*—Brundidge & Stanger, P.C.

(57) ABSTRACT

In a rotor of a rotary-electric machine, in order to improve a cooling performance of a rotor winding, in a rotor winding on an end portion of the rotor in an axial direction, the rotor winding being held by a retaining ring of the rotor winding formed by laminating a plurality of conductors in slots of a rotor iron core extending in an axial direction and having a plurality of slots formed at predetermined intervals in a peripheral direction, ventilation channels through which cooling air flows are formed in the surfaces of the conductors along a longitudinal direction. The ventilation channels have air inlet holes which guide the cooling air and exhaust holes which exhaust the cooling air, the conductors provided with the ventilation channels which are formed in the surfaces of the conductors along the longitudinal direction and through which the cooling air flows are laminated to constitute the rotor winding, and the conductors include openings of the air inlet holes in bottoms of the conductors on a side opposite to a side on which the ventilation channels are formed.

2 Claims, 8 Drawing Sheets

ROTOR OF ROTARY-ELECTRIC MACHINE

BACKGROUND OF THE INVENTION

1. Field of the Invention

The present invention relates to a rotor of a rotary-electric machine, more particularly to a rotor of a rotary-electric machine suitable as, for example, a rotor of a turbine generator in which ventilation channels for cooling air are formed in conductors constituting a rotor winding on an end portion of the rotor in an axial direction.

2. Description of the Related Art

A general turbine generator is generally constituted by disposing a rotor supported on a rotation shaft so that the rotor faces a stator. A rotor iron core constituting the rotor extends in an axial direction and has a plurality of slots formed at predetermined intervals in a peripheral direction, and a plurality of conductors forming a rotor winding are laminated and stored in the slots. The conductors are bound by wedges disposed on outer peripheries of the slots, and the wedges are designed so as to hold the conductors even during rotation at a high speed. A retaining ring is fixedly fitted into an end portion of the rotor winding in the axial direction so as to cover the portion via an insulating cylinder, and this retaining ring retains a centrifugal force of the conductors.

Additionally, in general, there is not any distinct channel through which cooling air circulates in the vicinity of the conductors under the retaining ring. Therefore, a temperature of this portion rises, but as a method for preventing the temperature rise of this portion, a method is proposed in which ventilation channels to circulate the cooling air are disposed in the conductors in a longitudinal direction. As shown in, for example, FIG. 9, a ventilation channel 41 through which the cooling air flows is formed on the surface side in a conductor 1 along an axial direction of the conductor and along a peripheral direction halfway. An air inlet hole 21 which communicates with this ventilation channel 41 to introduce the cooling air is disposed in a side surface of the conductor 1. An exhaust hole 51 to exhaust the cooling air which has flowed through the ventilation channel 41 is disposed so as to extend through the conductor 1 in a diametric direction. Furthermore, the cooling air which has flowed through the ventilation channel 41 to cool the conductor 1 is exhausted from an exhaust port 8 formed in a wedge 7 in FIG. 8.

A plurality of the conductors as shown in FIG. 9 are laminated in a multistage manner to constitute the rotor winding, and the cooling air is introduced into the ventilation channels from the air inlet hole formed in the side surface of the rotor winding. After circulating the cooling air through the ventilation channels to cool the rotor winding, the cooling air is exhausted together from the exhaust hole. This is described in JP-A-63-15644.

Moreover, a second air inlet hole of which an opening is formed in the side surface of the conductor is disposed halfway in the ventilation channel to improve a temperature distribution of the conductor in the longitudinal direction. This is described in JP-A-2003-88022.

However, in the above conventional technology (JP-A-63-15644), a temperature of each slot cannot necessarily be lowered efficiently. This will be described with reference to FIGS. 8 and 10. Here, it will be described in accordance with an example of a turbine generator which has a two-pole field system.

The rotor of the turbine generator usually rotates at a high speed such as 3000 or 3600 rotations per minute during a rating operation. At this time, the cooling air for cooling the conductors 1 of the rotor winding is introduced through a gap between a retaining ring 3 and a rotation shaft 2. Here, the cooling air is not introduced in parallel with the axial direction as viewed from the rotor. The cooling air is usually introduced in such a direction that the air has several rotation components. An air inlet angle of the introduced cooling air in such a direction having the rotation components changes with an amount of the cooling air of the rotor, a structure of a stator side, a flow rate of the cooling air on the side of the stator and the like. For example, if the generator has a diameter of 1 m and rotates at a speed of 3600 rotations per minute, a rotation speed of the conductor 1 is π×3600/60×1=188 m/s. Supposing that the cooling air does not have any speed in the peripheral direction in a space between a stator 5 and a rotor 4, cooling air 9 has a relative speed of 188 m/s in the peripheral direction as viewed from the rotor 4. Since an axial flow speed of the cooling air in this position is usually about 10 to 20 m/s, the introduced cooling air crosses the axial direction at approximately right angles as viewed from the axial direction.

This is shown in detail in FIG. 10. FIG. 10 is an enlarged view in the vicinity of the conductor 1 in FIG. 8 as viewed from a shaft end, and shows a structure in which a plurality of conductors shown in FIG. 9 are laminated.

In FIG. 10, in the surfaces of conductors 11 to 19, ventilation channels 41 to 49 are formed, respectively. In the side surfaces of the conductors, air inlet holes 21 to 29 are formed which introduce the cooling air into the ventilation channels, respectively. The conductors are turned back at a shaft end portion, and formed into a shape symmetric with respect to a magnetic pole 80.

Usually, an insulating spacer 70 is disposed in a magnetic pole portion in order to restrict movement of the conductors in the axial direction. In a case where a rotating direction is denoted with reference numeral 90, when the cooling air 9 is introduced at a high speed in the peripheral direction as described above, the cooling air 9 does not easily enter the backside (opposite to the rotating direction 90) of the insulating spacer 70. That is, in the example of FIG. 10, when the cooling air 9 blows into at a shown angle, a shaded area 100 is a shadow (backside) of the insulating spacer 70, and the cooling air 9 does not easily enter the backside. That is, there occurs a possibility that a necessary flow rate of the cooling air 9 which enters the air inlet holes 21 to 29 positioned in the shaded area 100 cannot be secured. If the air inlet angle of the cooling air 9 is close to 90°, the cooling air 9 might not flow at all. This also applies to air inlet holes 31 to 39 disposed in positions symmetrical to those of the air inlet holes 21 to 29 with respect to the magnetic pole 80 when the blowing direction of the cooling air 9 changes and the air inlet holes 31 to 39 enter the shadow of the insulating spacer 70. As a result, the temperature is raised without effectively cooling the conductors, and this results in a problem that a cooling performance of the rotor winding is not satisfactory.

BRIEF SUMMARY OF THE INVENTION

The present invention has been developed in view of the above problem, and an object is to provide a rotor of a rotary-electric machine in which a cooling performance of a rotor winding has been improved.

To achieve the above object, a rotor of a rotary-electric machine according to the present invention comprises: a rotor iron core extending in an axial direction and having a plurality of slots formed at predetermined intervals in a peripheral direction; a rotor winding constituted by laminating and storing a plurality of conductors in each of the slots of the rotor iron core; and a retaining ring which covers and holds an end portion of the rotor winding in the axial direction, the rotor winding held by the retaining ring on an end portion of the rotor in the axial direction being provided with ventilation channels which are formed in the surfaces of the conductors along a longitudinal direction and through which cooling air flows, the ventilation channels being provided with air inlet holes which introduce the cooling air and exhaust holes which exhaust the cooling air. The conductors provided with the ventilation channels which are formed in the surfaces of the conductors along the longitudinal direction and through which the cooling air flows are laminated to constitute the rotor winding, and the conductors are provided with openings of the air inlet holes in bottoms of the conductors on a side opposite to a side on which the ventilation channels are formed.

In the rotor of the rotary-electric machine according to the present invention, the cooling air can be introduced into the conductors constituting the rotor winding from the openings of the air inlet holes disposed in the bottoms of the conductors on the side opposite to the side on which the ventilation channels are formed. Therefore, regardless of an air inlet angle of the cooling air, the cooling air can efficiently be introduced. There is an advantage that a temperature rise of the conductors is inhibited to improve a cooling performance of the rotor winding.

An object to improve the cooling performance of the rotor winding is realized with a simple constitution without involving any large structural change.

Other objects, features and advantages of the invention will become apparent from the following description of the embodiments of the invention taken in conjunction with the accompanying drawings.

DETAILED DESCRIPTION OF THE INVENTION

[Embodiment 1]

Figure 7:
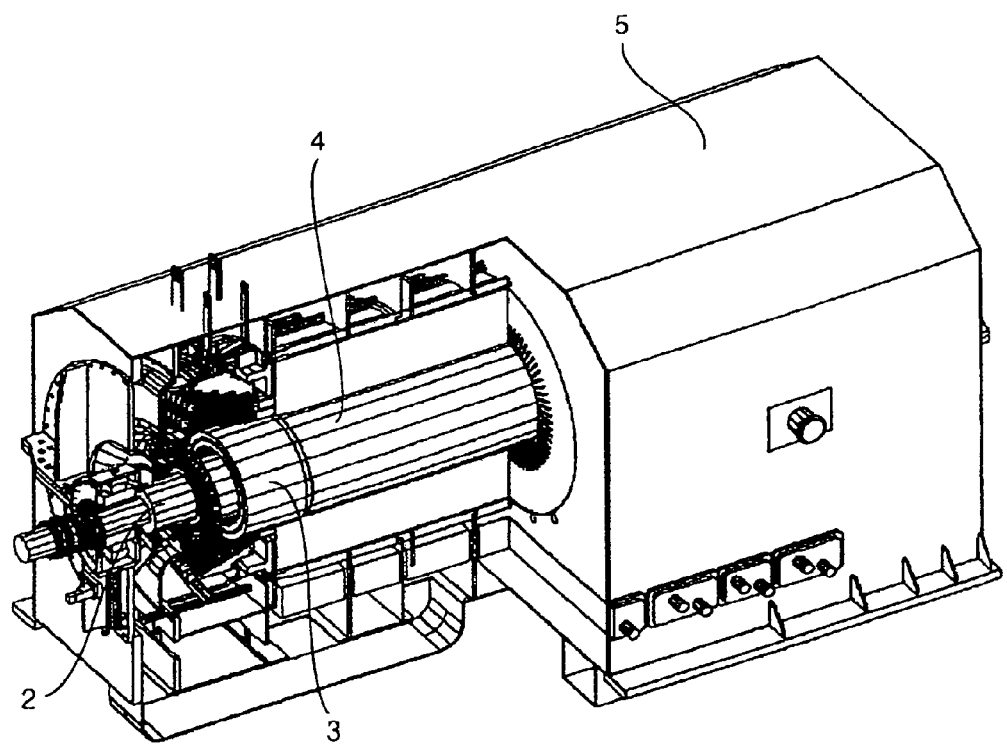
FIG. 7 is an entirely perspective view showing a partially cut state of a turbine generator according to one example of the present invention.
Figure 8:
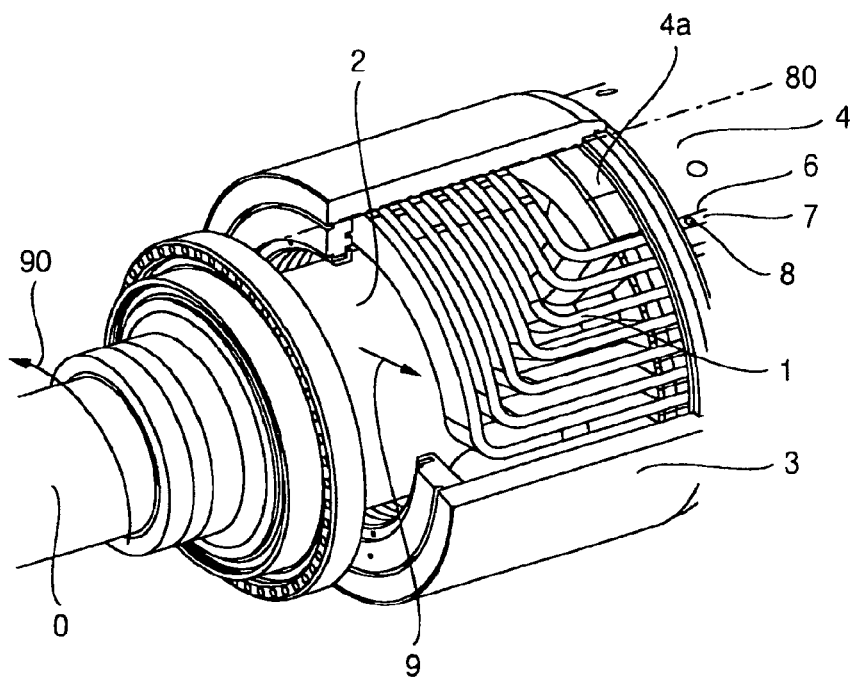
FIG. 8 is a partially perspective view showing an end portion of a rotor of FIG. 7.

A structure of a turbine generator is shown in FIGS. 7 and 8.

As shown, the turbine generator is generally constituted by disposing a rotor 4 supported by a rotation shaft 2 so that the rotor faces a stator 5. A rotor iron core 4a constituting the rotor 4 extends in an axial direction, and has a plurality of slots 6 formed at predetermined intervals in a peripheral direction. In the slots 6, a plurality of conductors 1 forming a rotor winding are laminated and stored. The conductors 1 are bound to the rotor iron core 4a by wedges 7 disposed on outer peripheral sides of the slots 6, and the wedges 7 are designed so as to hold the conductors 1 even during rotation at a high speed. A retaining ring 3 is fixedly fitted into an end portion of the rotor winding in the axial direction via an insulating cylinder so as to cover the end portion, and this retaining ring 3 retains a centrifugal force of the conductors 1.

Figure 9:
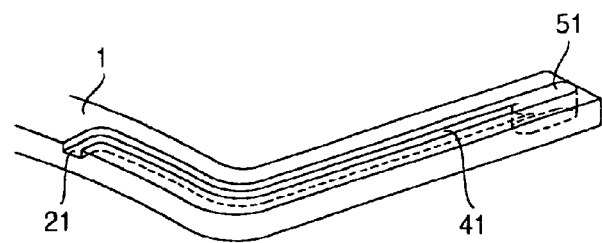
FIG. 9 is a partially perspective view showing a conventional conductor employed in a rotor winding of a turbine generator.
Figure 10:
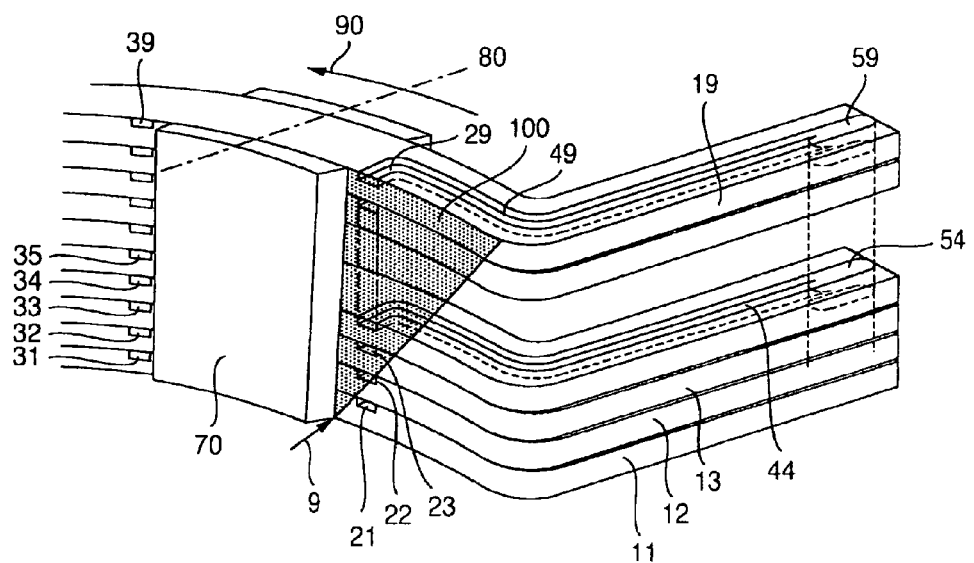
FIG. 10 is a partially perspective view showing a conventional rotor winding of the turbine generator in which the conductor shown in FIG. 9 is employed.

Additionally, in general, there is not any distinct channel through which cooling air circulates in the vicinity of the conductors 1 under the retaining ring 3. Therefore, a temperature of this portion rises, but as a method of reducing the temperature rise of this portion, a method is proposed in which ventilation channels to circulate the cooling air are disposed in the conductors in a longitudinal direction. As shown in, for example, FIG. 9, a ventilation channel 41 through which the cooling air flows is formed in the surface of the conductor 1 so as to extend along an axial direction of the conductor and along a peripheral direction thereof halfway. An air inlet hole 21 which communicates with this ventilation channel 41 to introduce the cooling air is disposed in the side surface of the conductor 1. An exhaust hole 51 to exhaust the cooling air which has flowed through the ventilation channel 41 is disposed so as to extend through the conductor 1 in a diametric direction. Furthermore, the cooling air which has flowed through the ventilation channel 41 to cool the conductor 1 is exhausted from an exhaust port 8 formed in a wedge 7.

Figure 1:
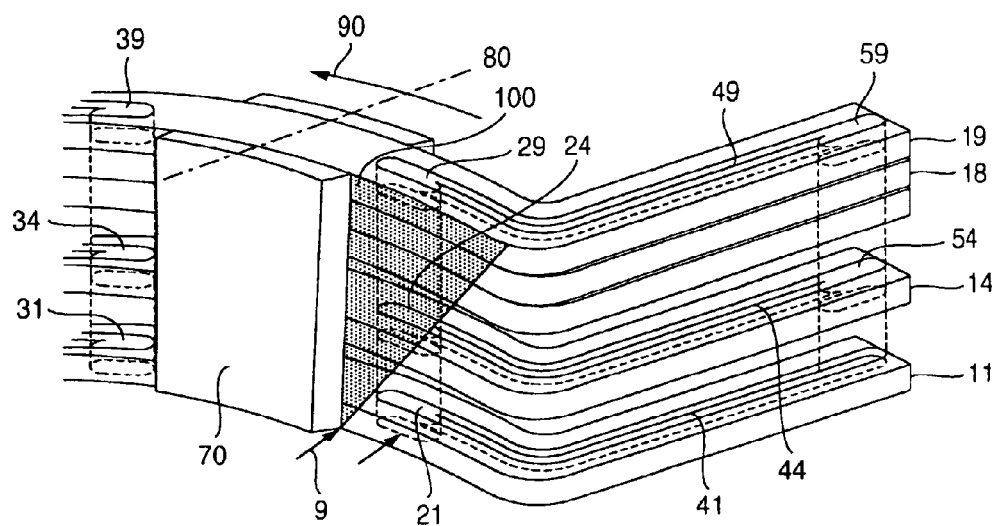
FIG. 1 is a partially perspective view showing a part of an end portion of a rotor winding in an axial direction in a turbine generator as according to one example of the present invention (Embodiment 1)

FIG. 1 shows the end portion of the rotor winding in the axial direction in the turbine generator as one example of a rotor of a rotary-electric machine according to the present invention.

In the same manner as a conventional rotor winding, the rotor winding shown in FIG. 1 is constituted by laminating and storing a plurality of conductors 11 to 19 in slots of a rotor iron core extending in an axial direction and having a plurality of slots formed at predetermined intervals in a peripheral direction.

Figure 2:
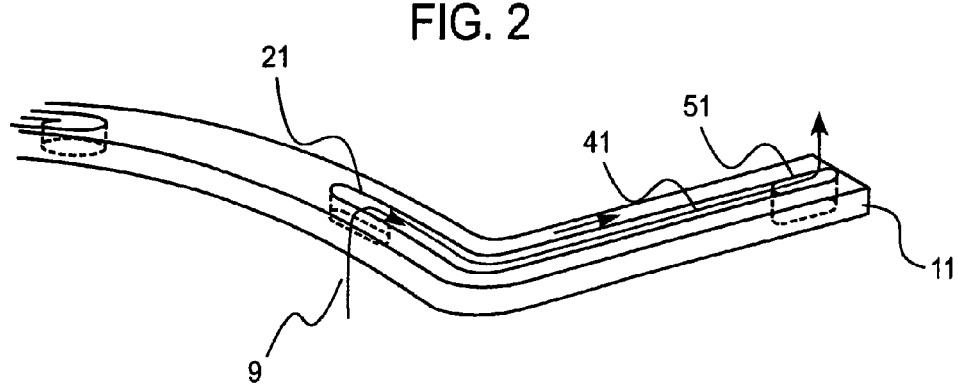
FIG. 2 is a partially perspective view showing one example of a conductor employed in the rotor winding of FIG. 1.

Among the conductors, one conductor 11 is shown in FIG. 2. As shown in the drawing, in the conductor 11, a ventilation channel 41 through which cooling air 9 flows is formed along an axial direction on the side of the surface of the conductor 11 and along a peripheral direction halfway. Furthermore, in the bottom of the conductor 11 on a side opposite to a side on which this ventilation channel 41 is formed, there is formed an opening of an air inlet hole 21 extending through the channel in a diametric direction to introduce the cooling air 9 into the ventilation channel 41. On the other hand, on the side of the ventilation channel 41 opposite to the side on which the air inlet hole 21 is formed, an exhaust hole 51 to exhaust the cooling air 9 which has flowed through within the ventilation channel 41 is disposed so as to extend through the channel in the diametric direction.

Moreover, when a plurality of conductors 12 to 19 having a constitution similar to that of this conductor 11 are laminated in the diametric direction, the ventilation channel is secured by covering the groove with a plane of the upper conductor, in which the ventilation channel is not formed. Furthermore, the air inlet holes and the exhaust holes continuously extend in the diametric direction to communicate with the ventilation channels of the conductors, respectively, thereby securing the holes.

With such a constitution of the present embodiment, the cooling air 9 is introduced into the rotor winding from openings of air inlet holes 21 to 29 formed in the bottoms of the conductors 11 to 19 on a side opposite to a side on which ventilation channels 41 to 49 are formed. Therefore, regardless of an air inlet angle of the cooling air 9, the air inlet holes 21 to 29 are not disposed behind (on the backside of) an insulating spacer 70. Accordingly, the cooling air 9 can effectively be introduced into the air inlet holes regardless of the speed in a peripheral direction. Therefore, the cooling air 9 which has entered the air inlet holes 21 to 29 passes through the ventilation channels 41 to 49 and is exhausted from exhaust holes 51 to 59. In consequence, a temperature rise of each conductor is reduced to improve a cooling performance of the rotor winding.

It is to be noted that it is preferable that a circulation area of the air inlet holes 21 to 29, the exhaust holes 51 to 59 and the like is set to be larger than a total circulation area of the ventilation channels 41 to 49.

[Embodiment 2]

Figure 3:
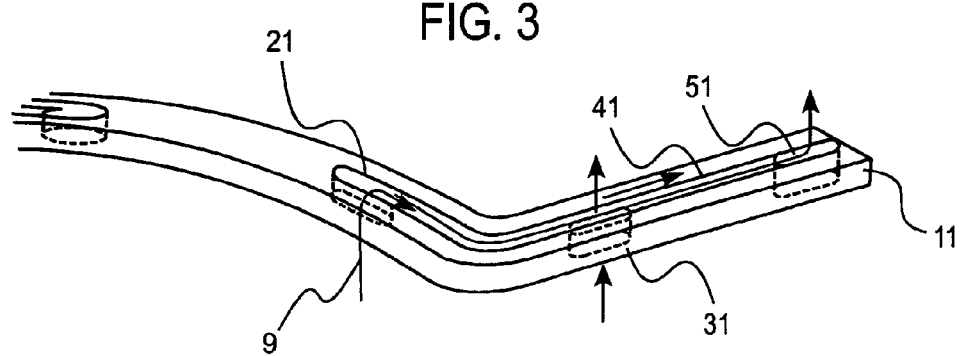
FIG. 3 is a partially perspective view showing another example of the conductor employed in the rotor winding of FIG. 1 (Embodiment 2)

FIG. 3 shows another example of a conductor employed in a rotor winding according to the present invention. In the shown example, in a middle of a ventilation channel 41 of a conductor 11 shown in FIG. 2, a second air inlet hole 31 is disposed in a bottom of the conductor on a side opposite to a side on which the ventilation channel 41 is formed. A plurality of conductors formed in such a manner are laminated in a diametric direction to constitute a rotor winding.

Even with such a constitution, needless to say, the above-described effect is achieved. Moreover, since a plurality of air inlet holes are disposed, a temperature distribution of the conductors in a longitudinal direction can arbitrarily be changed.

Figure 4:
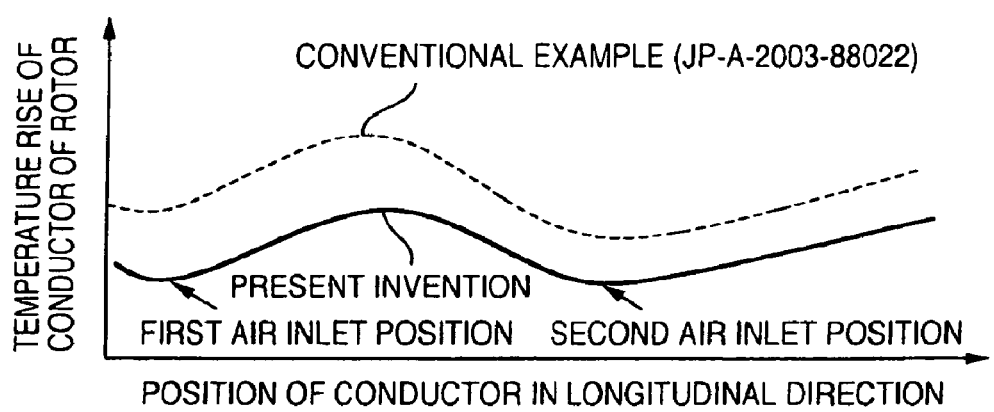
FIG. 4 is a characteristic diagram showing comparison of a relation between a position of the conductor in a longitudinal direction and a temperature rise of the conductor in the present invention with that in a conventional example.

FIG. 4 shows an example of a temperature rise in the position of each conductor in the longitudinal direction in a case where the conductor in FIG. 3 is used, the abscissa indicates the position of the conductor in the longitudinal direction, and the ordinate indicates the temperature rise of the conductor. As apparent from the drawing, it is seen that as compared with a conventional example (JP-A-2003-88022) in which the openings of the air inlet holes are disposed in the side surfaces of the conductors, a peripheral speed of incoming cooling air is high and the openings are obstructed by a structure such as an insulating spacer, in the present embodiment, the cooling air enters the air inlet holes from the openings in the bottoms of the conductors without being wasted. Therefore, a cooling flow rate increases over the whole length of each conductor in the longitudinal direction, and the temperature rise in the longitudinal direction of the conductor is reduced.

It is to be noted that in this example, there has been described an example in which two air inlet holes are disposed in one conductor, but a further air inlet hole may be disposed, or needless to say, a plurality of exhaust holes may be disposed in the conductor. Moreover, it is possible to omit an exhaust hole 51 of the lowermost conductor 11 having its bottom exposed to the cooling air.

[Embodiment 3]

Figure 5:
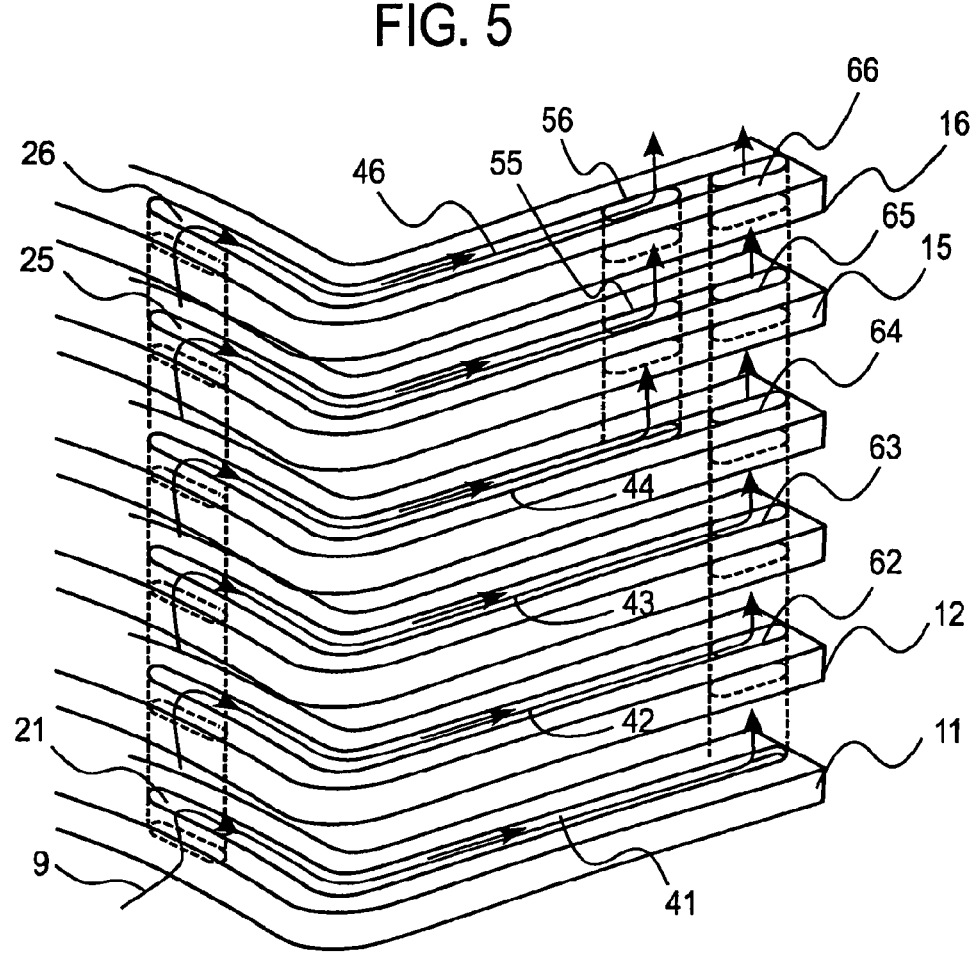
FIG. 5 is a partially perspective view showing a part of an end portion of a rotor winding in an axial direction in a turbine generator according to a third embodiment of the present invention (Embodiment 3)

FIG. 5 shows a third embodiment of the present invention. In this embodiment, openings of air inlet holes 21 to 26 are disposed in bottoms of conductors on a side opposite to a side on which ventilation channels 41 to 46 are formed. Moreover, the air inlet holes continuously extend in a diametric direction to communicate with end portions of the ventilation channels 41 to 46 formed in the surfaces of the conductors along a peripheral direction. Furthermore, in axial-direction end portions of the ventilation channels 41 to 46 formed in the surfaces of conductors 11 to 16 along an axial direction, the end portion in a lower part (conductors 11 to 13) of a rotor winding in a laminating direction of the conductors 11 to 16 is formed to extend longer than that in an upper part (conductors 14 to 16) of the rotor winding. As to exhaust holes which exhaust cooling air 9 flowing through the ventilation channels 41 to 46, there is formed a path (exhaust holes 55, 56) which communicates with the end portions of the ventilation channels 44 to 46 in the axial direction in the upper part of the rotor winding in the laminating direction of the conductors. Independently of the path, there is disposed a path (exhaust holes 62 to 66) which communicates with the end portions of the ventilation channels 41 to 43 in the axial direction in the lower part of the rotor winding in the laminating directions of the conductors and which extends through the conductors 12 to 16.

With such a constitution of the present embodiment, needless to say, an effect similar to that of the embodiment described above with reference to FIG. 1 can be achieved. Moreover, since two independent channels (the exhaust holes 54 to 56 and 62 to 66) are disposed, the cooling air having an appropriate flow rate can be circulated through upper and lower turns of the conductors, respectively, and this facilitates a temperature control. As a method of controlling the cooling air, a circulation area of the ventilation channel for each conductor turn may be changed, or a length of the ventilation channel in the longitudinal direction of the conductor may be changed. Alternatively, the number of the turns of the conductor accepted by one hole may be changed.

It is to be noted that any exhaust hole does not have to be disposed in the lowermost conductor having its bottom exposed to the cooling air. When a cooling effect is sufficient, a plurality of grooves of the conductors may be omitted.

[Embodiment 4]

Figure 6:
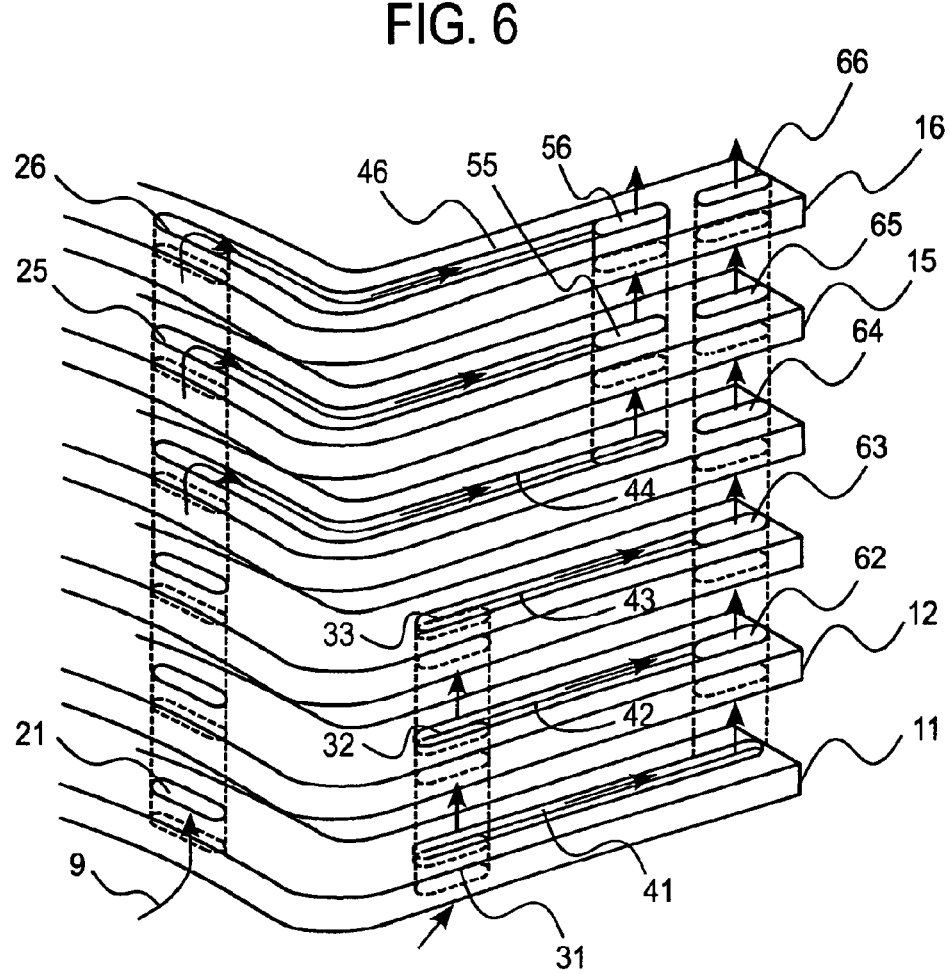
FIG. 6 is a partially perspective view showing a part of an end portion of a rotor winding in an axial direction in a turbine generator according to a fourth embodiment of the present invention (Embodiment 4)

FIG. 6 shows a fourth embodiment according to the present invention. In this embodiment, ventilation channels 41 to 46 which are formed in the surfaces of conductors 11 to 16 along a longitudinal direction and through which cooling air 9 flows are formed so as to extend along an axial direction on the side of the surfaces of the conductors and along a peripheral direction halfway in an upper part (conductors 14 to 16) of a rotor winding in a laminating direction of the conductors 11 to 16. In a lower part (conductors 11 to 13) of the rotor winding in the laminating direction of the conductors 11 to 16, the ventilation channels are formed in an only axial direction on the side of the surfaces of the conductors. Moreover, the ventilation channels include: the first air inlet holes 21 to 26 openings of which are disposed in bottoms of the conductors on a side opposite to a side provided with the ventilation channels 41 to 46 and which continuously extend in a diametric direction to communicate with end portions of the ventilation channels 44 to 46 formed along the peripheral direction on the side of the conductor surfaces; and, in the lower part (conductors 11 to 13) of the rotor winding in the laminating directions of the conductors 11 to 16, second air inlet holes 31 to 33 of which openings are formed in the bottoms of the conductors on the side opposite to the ventilation channels 41 to 46 and which continuously extend halfway in the diametric direction to communicate with end portions of the ventilation channels 41 to 43 in the axial direction, the channels being formed in the surfaces of the conductors 11 to 13 in the only axial direction. Furthermore, as to exhaust holes which exhaust the cooling air 9 flowing through the ventilation channels 41 to 46, there are formed: a path (exhaust holes 55, 56) which communicates with the other end portions of the ventilation channels 44 to 46 in the axial direction, the channels being formed along the axial direction and the peripheral direction, in the upper part (conductors 14 to 16) of the rotor winding in the laminating direction of the conductors; and, in the lower part (conductors 11 to 13) of the rotor winding in the laminating directions of the conductors, another path (exhaust holes 62 to 66) which communicates with the other end portions of the ventilation channels 41 to 43 in the axial direction, the channels being formed in the only axial direction, and which extends through the conductors 12 to 16, the paths being independent of each other.

With such a constitution of the present embodiment, needless to say, an effect similar to that of the embodiment described above with reference to FIG. 1 can be achieved. Moreover, two channels (the air inlet holes 21 to 26 and 31 to 33) are disposed in a longitudinal direction on an air inlet side, two channels (exhaust holes 55 and 56 and 62 to 66) are also disposed on an air exhaust side, and the ventilation channels 44 to 46 of the upper conductors 14 to 16 are constituted completely independently of the ventilation channels 41 to 43 of the lower conductors 11 to 13. Therefore, a temperature control is further facilitated as compared with the embodiment shown in FIG. 5. It is to be noted that any exhaust hole does not have to be disposed in the lowermost conductor having its bottom exposed to the cooling air.

According to the present invention, since a cooling medium flow rate distribution in an axial direction of a winding for each slot is improved, homogenization of a temperature rise of a rotor conductor and reduction of a temperature rise can be achieved. It is to be noted that in the present invention, a power generator has been described as an example, but the present invention is broadly applicable to a rotary-electric machine such as a motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotor of a rotary-electric machine comprising: a rotor iron core extending in an axial direction and having a plurality of slots formed at predetermined intervals in a circumferential direction; a rotor winding constituted by laminating and storing a plurality of conductors in each slot of said rotor iron core; and a retaining ring which covers and holds an end portion of said rotor winding in the axial direction, and said rotor winding being provided with ventilation channels on the surfaces of said conductors along a longitudinal direction and through which cooling air flows, said ventilation channels being provided with air inlet holes which introduce said cooling air and exhaust holes which exhaust the cooling air, wherein said ventilation channels which are formed in the surfaces of said conductors along the longitudinal direction and through which cooling air flows are formed along the axial direction and along the circumferential direction halfway in an upper part of said rotor winding in a laminating direction of said conductors, said ventilation channels are formed in the surfaces of said conductors in only the axial direction in a lower part of said rotor winding in the laminating direction of said conductors, said ventilation channels include:
  first air inlet holes of which openings are formed in bottoms of said conductors and which continuously extend in a diametric direction to communicate with end portions of said ventilation channels formed in the surfaces of said conductors along the circumferential direction; and
  second air inlet holes of which openings are formed in the bottoms of said conductors and which continuously extend halfway in the diametric direction to communicate with end portions of said ventilation channels in the axial direction, said ventilation channels being formed in the surfaces of said conductors in only the axial direction, in a lower part of said rotor winding in the laminating direction of said conductors, and as the exhaust holes which exhaust the cooling air flowing through said ventilation channels, a path which communicates with the end portions of said ventilation channels in the axial direction, said ventilation channels being formed along the axial direction and the circumferential direction, in the upper part of said rotor winding in the laminating direction of said conductors; and another path which communicates with the other end portions of said ventilation channels in the axial direction to extend through said conductors, the channels being formed in only the axial direction, in the lower part of the rotor winding in the laminating direction of the conductors, said paths being arranged independently of each other.

2. The rotor of the rotary-electric machine according to claim 1, wherein said exhaust hole is omitted from said conductor positioned in a lowermost part of said rotor winding.

* * * * *